United States Patent Office 3,395,587
Patented Aug. 6, 1968

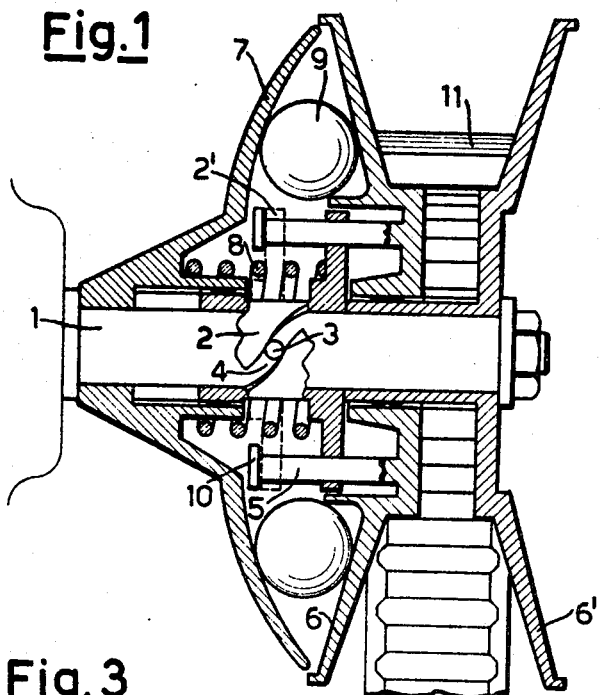
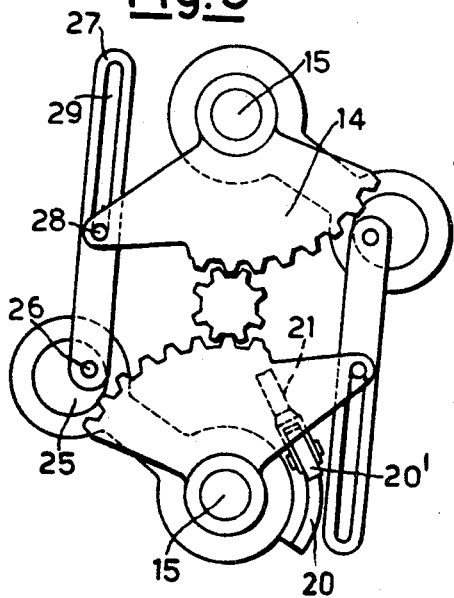
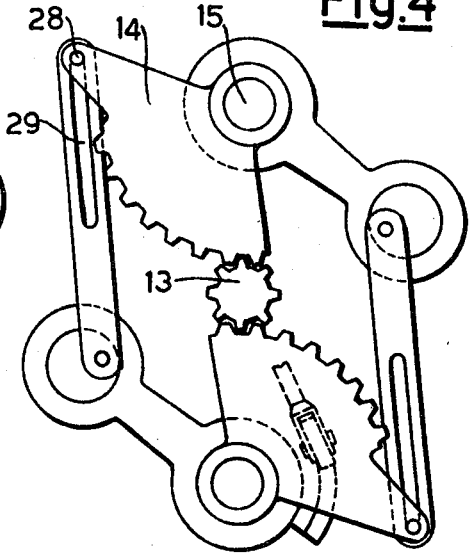

3,395,587
TORQUE-SENSITIVE STEPLESS SPEED
CHANGE GEAR
Vittorio Casini, Pisa, Italy, assignor to Piaggio & C. S.p.A.,
Genoa, Italy, an Italian company
Filed May 4, 1966, Ser. No. 547,517
Claims priority, application Italy, May 15, 1965,
Patent 760,539
15 Claims. (Cl. 74—230.17)

ABSTRACT OF THE DISCLOSURE

A device for varying the drive ratio between a driving member and a driven member in which a displaceable member controls the drive ratio and is subject to the action of a speed responsive mechanism to increase the drive ratio, and to the action of a torque responsive mechanism which decreases the drive ratio in opposition to the speed responsive mechanism only after a predetermined value of torque is reached.

---

Stepless speed change gears are known, having V-belts and expandable sheaves, wherein the velocity-sensitive member consists of a centrifugal force governor whose masses exert their action on the movable portion of the driving sheave: due to the action of these masses, the driving sheave tends to close as its speed is being increased thus causing the speed ratio of the driven sheave to be decreased. A suitable return spring is provided so as to cause the ratio of the speed of the driving sheave to the speed of the driven sheave to be decreased as the speed of the former is being decreased; if said spring is mounted on the driven sheave, it also acts as an idler for the belt.

It is important, however, whenever the variator is applied to an internal combustion engine, that a torque-sensitive device be provided, so as to cause the speed ratio between the driving sheave and the driven sheave to be increased, so that, whenever the utilizing device, for example a motor vehicle, requires a high torque along with a high rotational speed of the engine, the ratio is not too low and an excessive slowing down of the engine not be required in order to cause said ratio to be increased, the consequence being a decrease of the delivered power. Such a function is already fulfilled, at least in part, by the tension differential between the two laps of the belt which, as the torque is being increased, acts less intensively upon the race of the driven sheave than it does on the race of the driving sheave, thus showing a tendency towards wrapping the latter according to decreasing diameters.

This belt-adjusting action is, however, not absolutely capable of adjusting the gear ratio in any appreciable manner if it is desired that the engine is running within a sufficiently wide r.p.m. range. As a matter of fact it is desirable, for reasons of efficiency and quiet operation, that the engine may run at low speed when the gas intake, and thus the power demand, are reduced. If the variator, for example, is applied to a vehicle, it is necessary, for the reasons outlined above, that the lowest ratio can be maintained from the highest vehicle speed, obtainable at the maximum output of the engine at a high r.p.m., to a relatively low speed (10 to 12 miles an hour) when the engine runs at a reduced gas intake and a low r.p.m. At so low a speed, the action of the masses of the centrifugal governor should already be higher than, or at least equal to, that which is necessary for counteracting the maximum thrust of the return spring (placed on the driven sheave), corresponding to the preload stroke so as to maintain the belt taut at the highest ratio, plus the stroke of the driven half-sleeve so as to pass down to the lower gear ratio.

Since at the above mentioned speed of the vehicle, the entire output power of the engine may be required, for example to ascend a steep hill or to obtain a maximum acceleration, it is necessary to be capable of having the engine running at the speed of maximum output, that is, at a speed which is 4 or 5 times the above indicated speed. The gear ratio of the variator, therefore, should be correspondingly increased of the same extent. To do so, it is necessary that the action of the torque may overcome that of the centrifugal governor, which latter action, due to the proportionality of the centrifugal force to the square of the speed, is increased to 16–25 times with respect to the previous value. Inasmuch, however, that the torque can be increased, in an internal combustion engine, by 3 or 4 times only when passing from the lowest to the highest working speed, the result is that an effective regulating action as a function of the torque cannot be achieved by following a law of proportionality as in conventional mechanical devices.

As a matter of fact, in vehicles equipped with belt variators, whose governing action follows a law which is slower than the proportionality law even if said variator is fitted with a supplemental mechanical device having an action proportional to the torque, the range of adjustability of the engine speed has proven to be considerably narrow, with the attendant disadvantage of having high engine speeds with a reduced gas intake along with an inadequate power output when the speed of the vehicle is below the maximum value. In addition to that, also the fuel and oil consumption are high.

To have minimum fuel consumption, it is necessary that the engine operate at a speed which corresponds to the maximum efficiency for each throttle opening, irrespective of the vehicle speed. The law of variation of the governing action as a function of the torque should thus be such as to vary the calibration of the centrifugal governor, which would tend to keep the r.p.m. of the engine steady, so that, as the torque is being increased, also the value of the governed speed is increased, consistently with the above recalled maximum efficiency law. Said law includes also the above mentioned cases in which it is possible to have widely different engine speeds for the same speed of the vehicle and the lowest ratio can be used even at low vehicle speeds.

The problem of obtaining torque output which varies with the r.p.m. according to the above mentioned law, so as to be enabled to overcome the counter-action of the centrifugal governor for any speed of the engine, can be solved by weakening the action of the centrifugal governor, by lightening the masses thereof, so as to have this remainder action just sufficient at the high engine speeds, while the thrust which is needed for the low engine speeds can be obtained from a supplementary means. In a conventional variator, this means consists of the pressure of a gas which is adjusted down to a zero value by the position of the engine accelerator. Said device affords many advantages, but requires an intricate pneumatic installation equipped with valves, pipings, reservoirs, and the like. Moreover, at a low speed and in the case of a sudden acceleration, this device does not cause the engine to operate according to the best efficiency characteristic curve.

A preloaded spring could also be used in lieu of gas pressure. Difficulties are experienced, however, in nullifying its action at low speeds so as to overcome the effect that said spring, by hindering the action of the spring of the driven sheave, may force the variator towards the position corresponding to the lowest gear ratio down to very low engine or vehicle speeds. If so, the change gear would be unable to attain the highest ratio when the vehicle is stopped and it would become very hard to obtain a quick start or an immediate pickup.

The problem has been mechanically solved, in a simple way, by the present invention, in a manner basically different from that heretofore known by causing the action of the torque to oppose said action of the centrifugal governor at the highest speeds and also at low speeds so long as the transmitted torque exceeds a predetermined value. This is achieved by means of a preloaded spring which acts against the member which is responsive to the action of the torque. By so doing, the nullification of the action of the spring at the low r.p.m., so as to do away with the above indicated drawback that the maximum ratio is not attained with adequate rapidity, takes place automatically as the torque falls below a preselected value which corresponds to a preselected value of the engine's r.p.m., in that the spring action is discharged against a specially provided abutment or during a specially provided lost motion stroke.

At values below the magnitude of torque which corresponds to the spring preloading, the equilibrium of the variator cannot be disturbed by a sudden stop of the intake so as to give rise to a sudden halt, and thus the r.p.m. of the engine remains at that value fixed by the centrifugal governor, whereas, as the translational speed of the vehicle drops, the variator rapidly attains, at the dead point, the highest reduction ratio. The above described system, at torque values above the preloaded spring, operates as previously outlined wherein the preloaded spring directly thrusts against the centrifugal masses, but there is the great advantage of automatically excluding the action of the spring at the low speeds. Also from a constructional standpoint, both the centrifugal governor and the mechanism which makes an adjustment as a function of the torque are sturdier. Moreover, the spring which counteracts the action of the torque, along with its related mechanism, can also be positioned on the axle of the driven sheave.

Preloading of the spring cannot necessarily equal either the highest or the lowest ratio: which is of importance is that the one corresponding to the lowest ratio be adequate so as to ensure the possibility of a rapid variation of the same ratio as the vehicle comes to a halt. The preloading of the resilient member which reacts against the torque action can be obtained by a lost motion stroke of the member driven by the torque before it may act upon the variator, or it can also be obtained as the spring is installed.

In order that the subject-matter of the present invention may be fully understood, two illustrative embodiments thereof will be now described and shown in the accompanying drawings, wherein:

FIGURE 1 is an axial sectional view of the gear ratio variator according to the present invention.

FIGURES 3 and 4 show details of the variator shown in FIG. 2.

Figure 2:
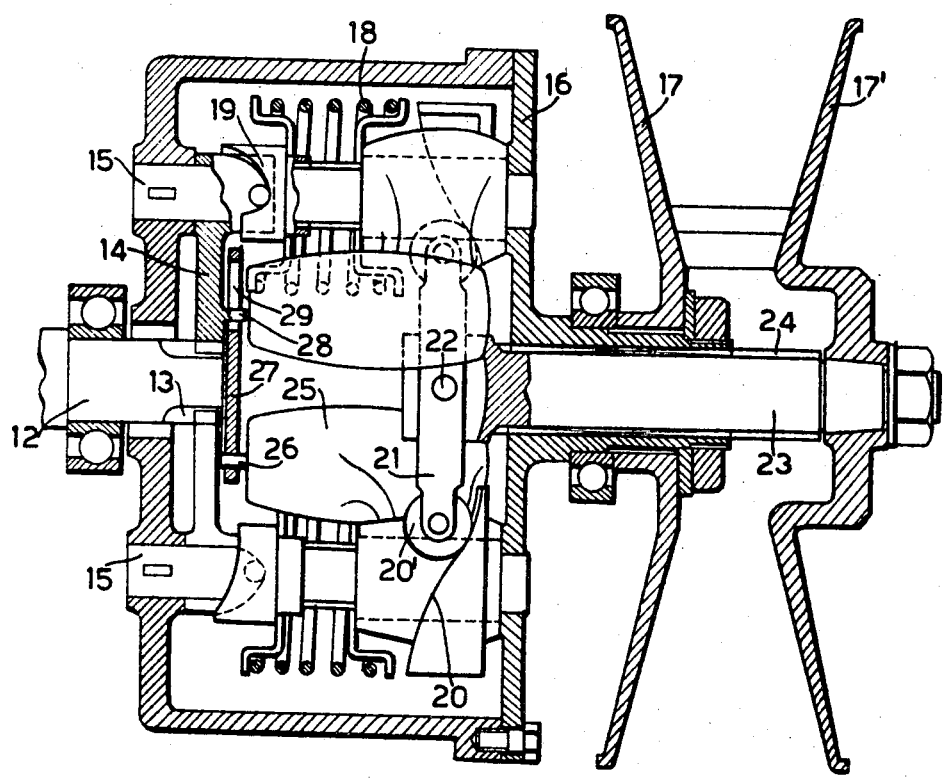
FIGURE 2 is an axial sectional view of an alternative variator according to this invention.

Having now reference to FIG. 1, a drive shaft 1 is connected to a slider 2 by means of a helical coupling formed by a pin 3 which slides within a slot 4. The slider 2 is slidably connected to guides 5 which extend from half-sheave 6. Said slider 2 is connected via a sliding connection, with a shaped dish 7 and a spring 8 is interposed between the slider 2 and the dish 7. Between the dish 7 and the outer face of the half-sheave 6 are positioned centrifugal spherical masses 9. The spring 8 is preloaded so as to impart, when in rest state, a thrust on the slider 2 at the rightmost dead center thereof as viewed in the drawing, which is opposed to that which would correspond to a certain driving torque acting on the helical coupling of the slider.

At the free ends of the guides 5, abutments 10 are formed, the length of said guides being such that, when the sheaves 6 and 6' are wholly open, the slider 2 will engage the abutments 10 only when said slider is in its leftmost dead center position, i.e. the position indicated by 2' in dotted outline.

As the balls 9 move outwardly, the half-sheaves 6 and 6' are urged towards one another to effect contraction of the race between the two half-sheaves and thus the belt 11, housed therein, is caused to assume an increasing diameter of wrap on the sheave. The half-sheave 6 has a lost motion stroke corresponding to the travel of the slider before the abutments 10 engage the slider 2, and the magnitude of the lost stroke decreased until it reaches zero when the half-sheaves are closest to one another.

The belt 11 is then wrapped on an expansible driven sheave, the widening of whose race is counteracted by a spring: thus, the belt will be kept taut and the movement of the masses 9 from the shaft 1 will also be resiliently counteracted.

The operation of the variator shown in FIGURE 1 can be summarized as follows: the variator is mounted as a driving sheave and, as the r.p.m. of the drive shaft 1 is increased, the balls 9 move outwardly thus forcing the two half-sheaves 6 and 6' close to one another. The belt 11 wraps on the sheave in ever increasing diameter and thus the ratio of the driving sheave speed to the driven sheave speed is being decreased. As a torque is applied to the variator, which is stronger than that which corresponds to the preloading of the spring 8, the action of the pin 3 in the helical slot 4 will cause the slider 2 to be slid to the left as viewed in the drawing. The slider, besides having to overcome the preload of the spring 8, also compresses said spring along an increasing path as the speed of the variator is decreased, before being able to engage the abutments 10. Thus, the lowermost limit of intervention of the governing action of the torque in the maximum ratio position will be slightly higher than that possessed in the minimum ratio position. Above the aforesaid limits, the ratio variation will be governed simultaneously by the speed and the torque. In contrast, below the preloading torque, and more particularly the minimum ratio torque, when the slider is in the rightmost dead center position as viewed in the drawing, the displacement of the half-sheave 6 and thus the variation of the ratio, can take place due to the effect of the only action of the centrifugal masses 9 since the rods 5 freely slide within the slider 2. This action is very vigorous since the masses are designed so as to counteract the maximum thrust of the reaction spring placed on the driven sheave at the speed which is prescribed as a minimum for the operation of the variator. Thus, a slight reduction of the vehicle's speed and hence of the engine below the r.p.m. which corresponds to the preloading torque, is sufficient for the variator to rapidly attain the maximum ratio position.

A partial modification of what has been described above is that the preloading of the spring 8 can be obtained, instead of in the assemblage of the device by a lost motion stroke of the slider. In this case, it is sufficient to extend the guides 5 and the seating of the spring 8 to fit the preload stroke.

Another embodiment of the variator according to the present invention, which operates similarly to the embodiment described above, is shown in FIG. 2, details thereof being shown in FIG. 3 and in FIG. 4.

The drive shaft 12 is connected to the pinion 13 which makes up, with the sectors 14 an epicyclic train: the sectors 14 are keyed to pins 15 supported by a box enclosure 16 affixed to the half-sheave 17, this latter, in turn, being slidably coupled to the half-sheave 17'. A preloaded spring 18 acts upon each slider 19 coupled to a sector 14 via a helical surface on slider 19 and an engaging pin on sector 14. The sliders 19 are allowed to slide axially along the pins 15 thus enabling the sectors 14 to be rotated only by compressing the springs 18. Centrifugal masses 25 are freely pivoted about the pivots 15 of the box 16 and move a helical ramp 20 which engage rollers 20' of a pitman arm 21, fulcrumed at 22 to a rod 23 affixed to the movable sheave 17'. The rod 23 is slidably coupled by means of a slot 24 to the box 16 and thus also to the sheave 17.

Having now particular reference to FIG. 3, rods 27 are fulcrumed at 26 to the masses 25: said rods have longitudinal slots 29 in which pivots 28 of the sectors 14 are allowed to slide.

The operation of the variator is similar to that as described above with reference to FIG. 1. As the centrifugal masses 25 move outwardly of the rotation axis, the rollers 20' are caused to ascend the helical ramps 20 and thus the race between the half-sheaves 17 and 17' is caused to contract. A V-belt (not shown) runs within said race and as the angular velocity of the variator is increased, the belt will thus wrap on the sheave over an increasing diameter. A torque transferred by the belt gives then rise to a relative rotation of the shaft 12 and of the box 16, the consequence being an angular displacement of the sectors 14 counteracted by the springs 18. A suitable preloading of the springs 18 will give rise to a minimum torque value which, as desired, will not interfere with the movement of the sectors 14.

The sectors 14 are in a at rest position as shown in FIG. 3 and in a position of maximum shift as shown in FIG. 4. FIG. 3 clearly shows how a displacement of the masses 25 away of the center will cause sliding of the slots 29 about the pins 28 and thus the path, that the sectors 14 traverses before the pivots 28 engage the rods 27 thus acting upon the masses 25 so as to bring them towards the center, is decreased.

As the sectors 14 are brought to the rest position, a torque smaller than the preloading torque and the stroke that the pivots 28 are allowed to make in the slots 29 will allow the masses 25 to adjust the variator as a function of the speed of rotation only, thus permitting the half-sheaves 17-17' to be separated at a low speed of rotation: this gives rise to an increase of the gear ratio which presets the gear assembly to an immediate pickup with a maximum torque for the driven sheave.

What is claimed is:

1. A device for varying the drive ratio between a driving member and a driven member, said device comprising a displaceable member movable in opposite directions to cause said drive ratio to be increased or decreased dependent upon its direction of movement, first means responsive to the speed of the driving member for displacing said displaceable member to diminish said ratio as the speed is increased, second means responsive to the transferred torque for displacing said displaceable member in a direction opposite that produced by the first means to cause said ratio to be increased with increased torque and resilient means acting on said second means to preload the same and permit displacement of the displaceable member by the second means only after a predetermined increase in torque whereby below said predetermined increase of torque only the first means is operative to diminish said ratio, whereas above said predetermined increase in torque the variation of the drive ratio is a function of the first and second means acting in opposition to one another.

2. A device as claimed in claim 1 wherein said driving member and driven member include expandable sheaves and a belt coupling said sheaves.

3. A device as claimed in claim 2 wherein said sheave of the driving member includes two portions one of which is slidably mounted relative to the other and constitutes said displaceable member.

4. A device as claimed in claim 1 wherein said first means which is responsive to the speed of the driving member includes a centrifugal mass which rotates about an axis together with the driving member, said mass moving outwards of said axis as the speed of rotation of the driving member increases.

5. A device as claimed in claim 1 wherein said second means is coupled directly to said displaceable member to move the same.

6. A device as claimed in claim 1 comprising coupling means between said second means and the displaceable member to enable movement of the latter in response to operation of the second means.

7. A device as claimed in claim 1 comprising means coupling the second means and the first means such that the action of the first means is directly counteracted by the action of the second means, and means connecting the first means with the displaceable member.

8. A device as claimed in claim 1 wherein said second means includes a lost motion device which interrupts connection between the second means and the displaceable member, said lost motion device being acted on by said resilient means and being overcome to provide connection between the second means and the displaceable member when the transferred torque exceeds said pre-determined increase thereof.

9. A device as claimed in claim 1 wherein said second means and resilient means are mounted on the slidably mounted sheave portion.

10. A device as claimed in claim 4 comprising means coupling the second means and the first means such that the action of the first means is directly counteracted by the action of the second means, and means connecting the first means with the displaceable member.

11. A device as claimed in claim 10 wherein said first means comprises a helical ramp coupled to said mass for movement therewith, said means connecting the displaceable member with said first means comprising an arm coupled to said displaceable member for moving the same, and a roller coupled to said arm and engaging said ramp, said ramp being shaped to move the arm, and thereby the displaceable member, as the centrifugal mass is moved outwards.

12. A device as claimed in claim 11, wherein said means which couples the first and second means comprises a rotatable shaft supporting said mass, a rod coupled to said mass, said resilient means including means connecting said first means and said rod, with lost motion, for urging said rod in a direction to move the mass inwards after said predetermined increase of the transferred torque.

13. A device as claimed in claim 12, wherein said means connecting said first means and the rod with lost motion comprises a pin on said first means engaged in a slot provided in the rod such that the pin travels in the slot as the rod is moved by the mass until the pin reaches the end of the slot at which time the second means can move the rod and move the mass inwards.

14. A device as claimed in claim 13, wherein said resilient means comprises a second helical ramp, a further pin engaging said ramp and rotatable relative thereto in response to torque increase and spring means acting on said ramp to urge the same against said further pin and resist relative rotation therebetween until said predetermined increase of torque is reached.

15. Apparatus for regulating the drive ratio between a driving member and a driven member comprising first means coupled to said members for varying the drive ratio therebetween, speed responsive means coupled to the driving member for acting on said first means to diminish the drive ratio as the speed of the driving member increases, torque responsive means coupled to said first means for increasing the drive ratio as the transmitted torque is increased, and means acting on the torque responsive means to limit action thereof on said first means until the transmitted torque exceeds a predetermined value.

References Cited

UNITED STATES PATENTS 2,987,934   6/1961   Thomas _____ 74—230.17

FOREIGN PATENTS 1,148,087   6/1957   France.
435,257   9/1935   Great Britain.

C. J. HUSER, *Primary Examiner.*